July 16, 1957   C. R. NICKOLS   2,799,294
MULTIPLE VALVE

Filed Sept. 28, 1951   7 Sheets-Sheet 1

Inventor
Chester R. Nickols

Atty.

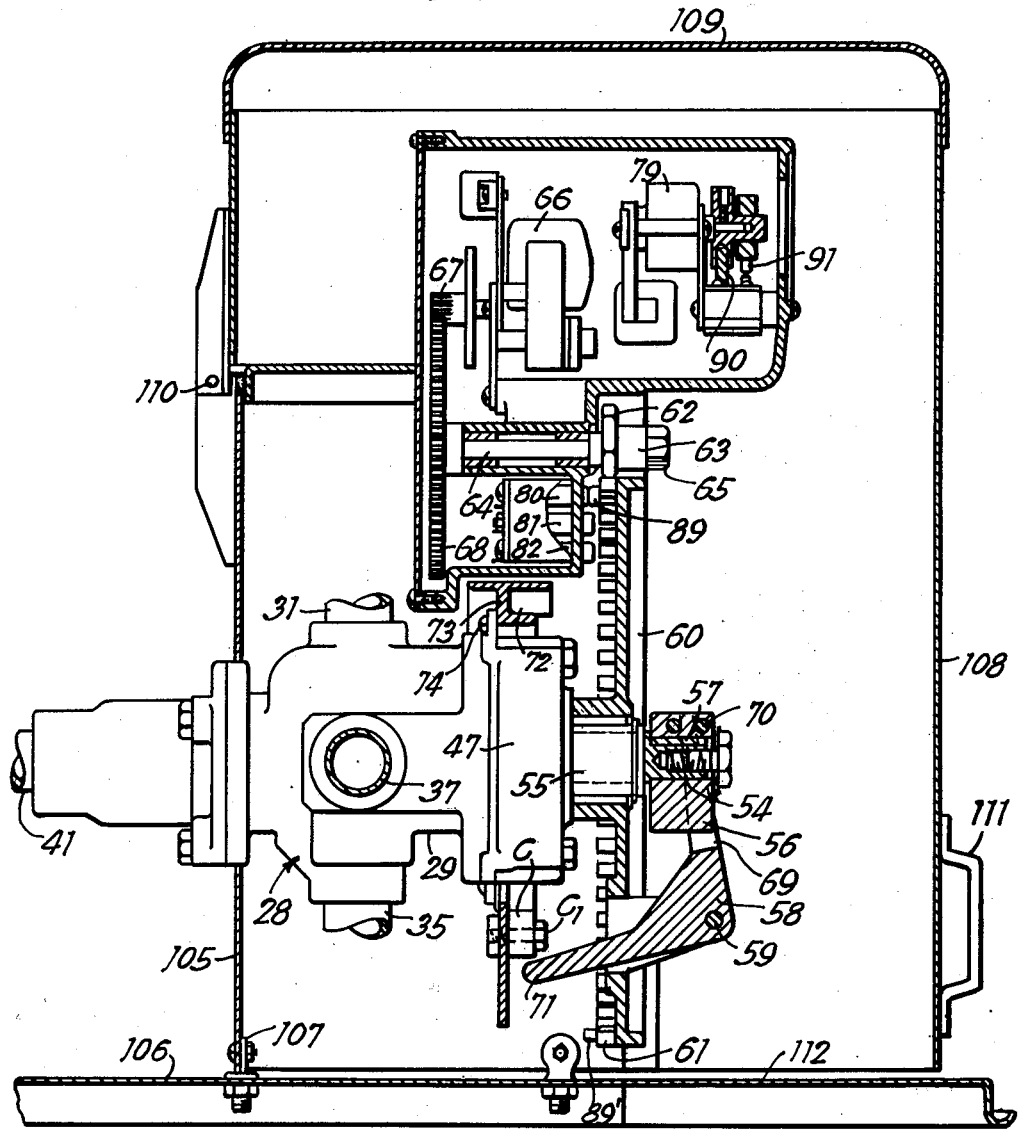

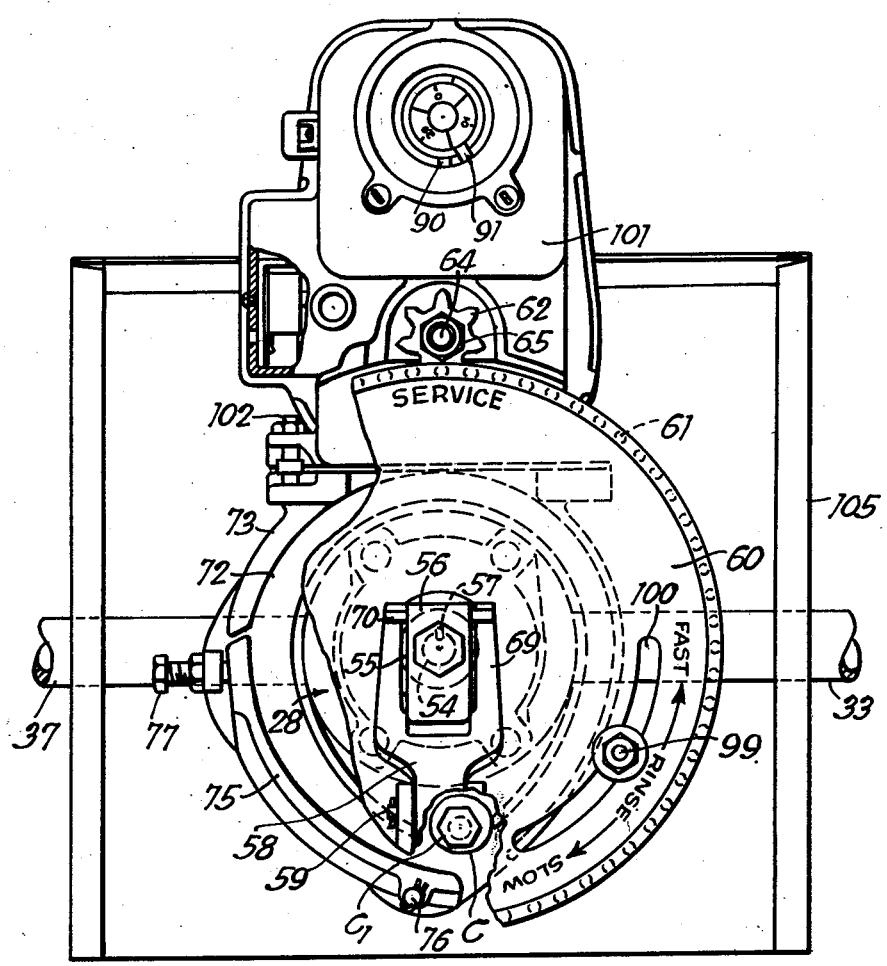

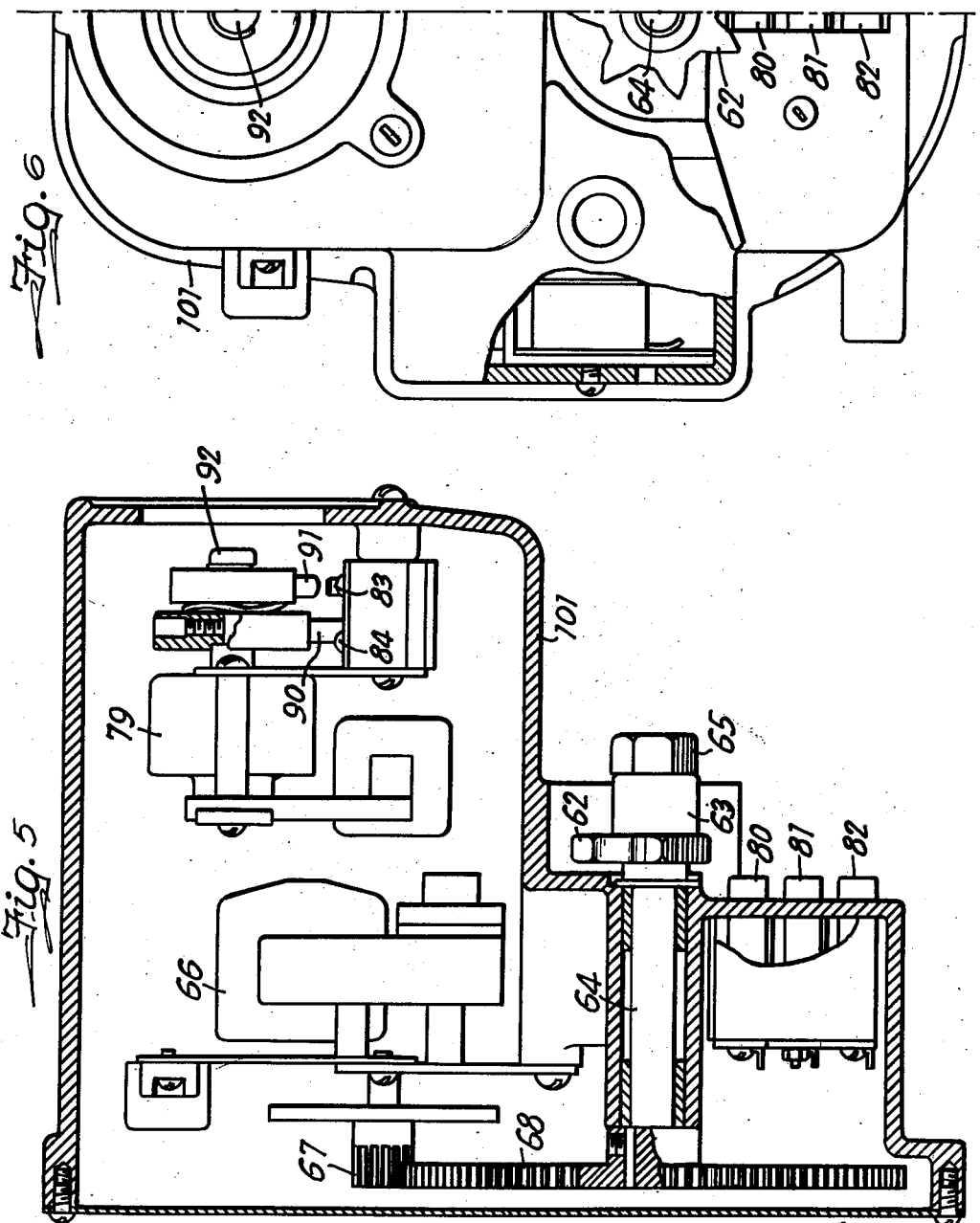

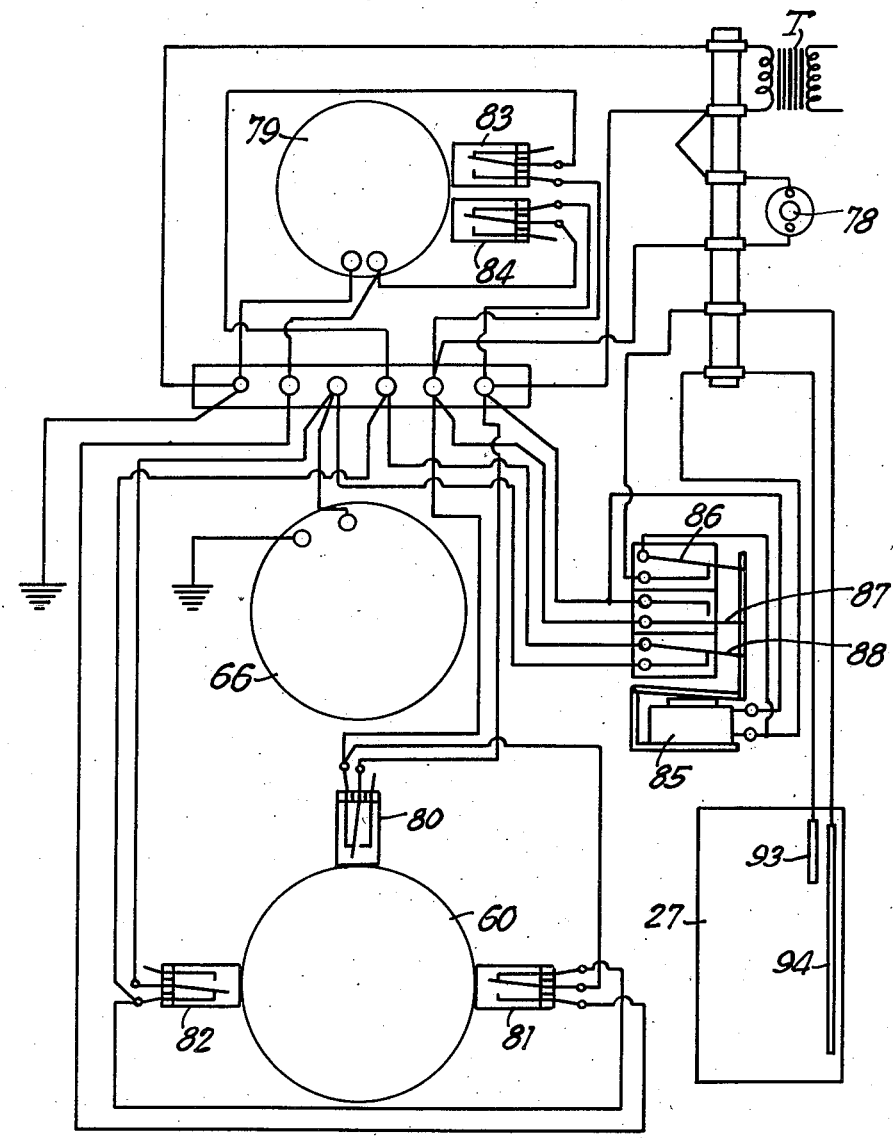

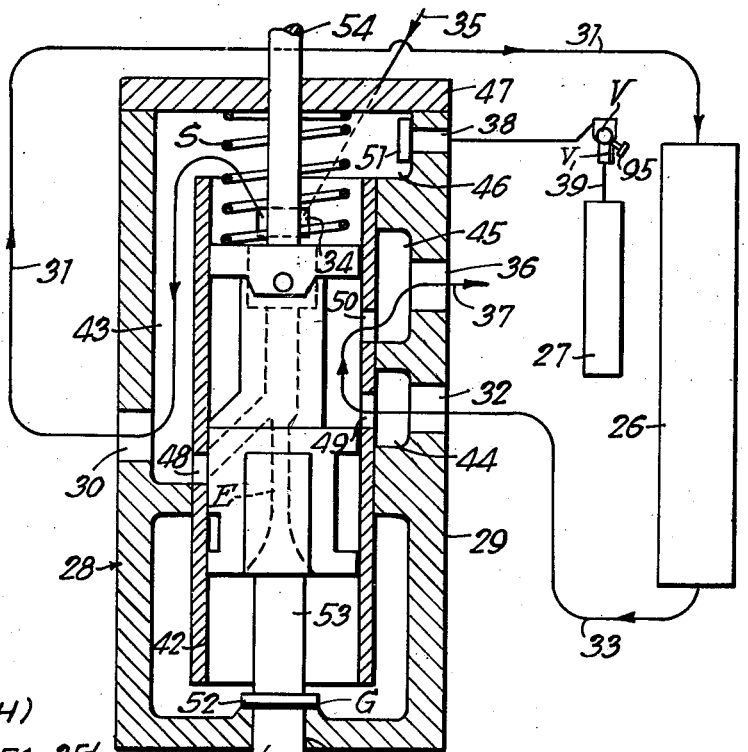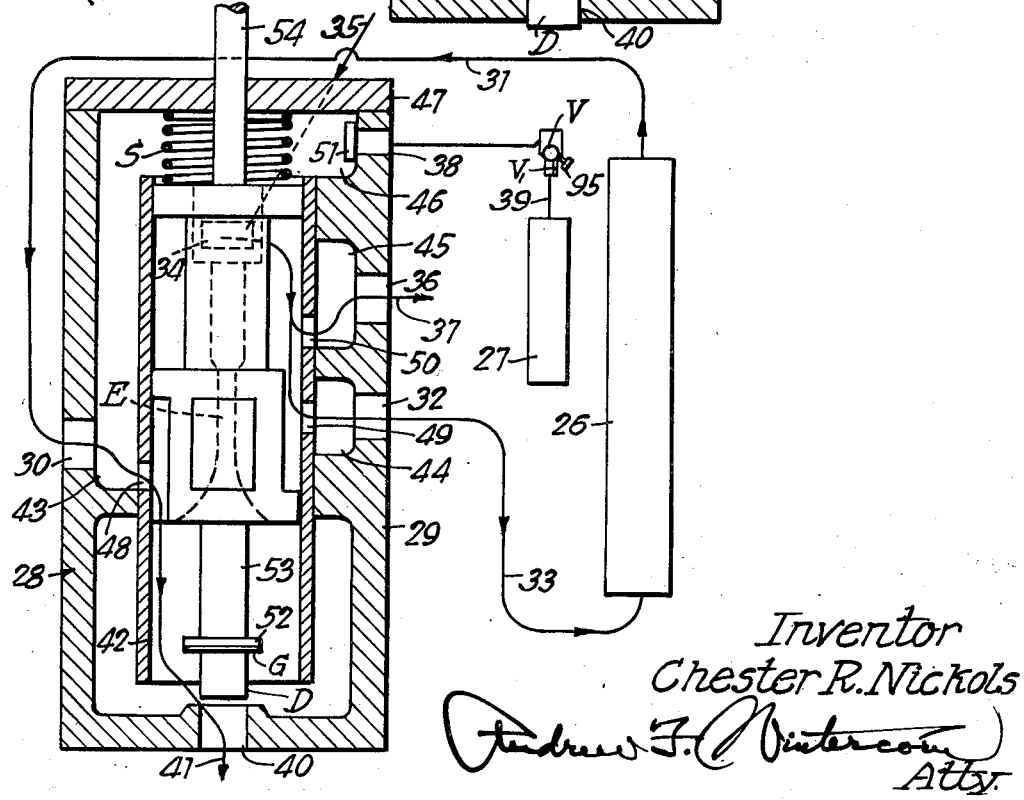

July 16, 1957 C. R. NICKOLS 2,799,294
MULTIPLE VALVE
Filed Sept. 28, 1951 7 Sheets-Sheet 7

(SALT DRAW)

(RINSE & REFILL)

Inventor
Chester R. Nickols
Andrew F. Wintercorn
Atty.

United States Patent Office 2,799,294
Patented July 16, 1957

2,799,294

MULTIPLE VALVE

Chester R. Nickols, St. Charles, Ill.

Application September 28, 1951, Serial No. 248,714

26 Claims. (Cl. 137—631)

This invention relates to a new and improved multiple valve.

The principal object of my invention is to provide a multiple valve, in which a multiported plunger is turned relative to a multiported body, and is also given reciprocatory movement relative thereto, the plunger having an operating wheel connected therewith through an oscillatable bell-crank member or yoke pivoted intermediate its ends on the wheel, and having a fork at one end arranged to transmit reciprocatory as well as rotary movement to the plunger, the other end of the bell-crank being movable as a follower in an annular cam track, the shape of which determines the axial position of the plunger for any given position of rotation of the operating wheel. This cam track, in accordance with the present invention, includes a pivoted radially adjustable segment that may be set in any desired position of adjustment, by means of a screw, to enable varying the backwash flow rate in accordance with a given water pressure for a given water softener installation, by the restriction more or less of a drain port in the body by the axial adjustment of the plunger in relation to it, predetermined by the adjustment of the cam track segment. The backwash time is also selective, there being a timer motor the low speed driven shaft of which requires, say, 30 minutes, for example, to make a complete turn and has two cams turning with it, each arranged to operate a limit switch, and the cam being adjustable angularly relative to one another according to the backwash time desired—anywhere up to as much as 30 minutes.

Another object of the present invention is the provision of a power motor for operating the valve, and a timer motor for timing the backwash, housed in a sealed unit that is easily removable from the softener and replaceable by a new sealed unit in the event of any electrical trouble, the defective unit being then returned to the factory for repairs. The shaft driven by the power motor extends from the unit and carries a drive pinion which is easily disconnectible from the pin gear on the valve operating wheel so that such disconnection of the sealed unit is possible without any disassembling. The pinion is also disconnectible from the shaft by loosening a friction drive clutch nut so that the wheel can be turned by hand whenever hand operation of the valve is desired, as at the time of installation, when the various adjustments are being checked.

The invention is illustrated in the accompanying drawings, in which—

Fig. 3 is an enlargement of a portion of Fig. 1 better illustrating the multiple valve and its relationship to the rest of the automatic control mechanism;

Fig. 4 is a front view of the control mechanism in Fig. 3;

Fig. 5 is a further enlargement of a portion of Fig. 3 better illustrating the timer motor and the drive motor;

Fig. 6 is a partial front view of Fig. 5;

Fig. 7 is an electrical wiring diagram of the automatic control mechanism, and

Figs. 8 to 11 are diagrammatic views of the multiport valve illustrating the operation thereof in service, backwash, brining, and rinsing, respectively.

The same reference numerals are applied to corresponding parts in these views.

Figure 1:
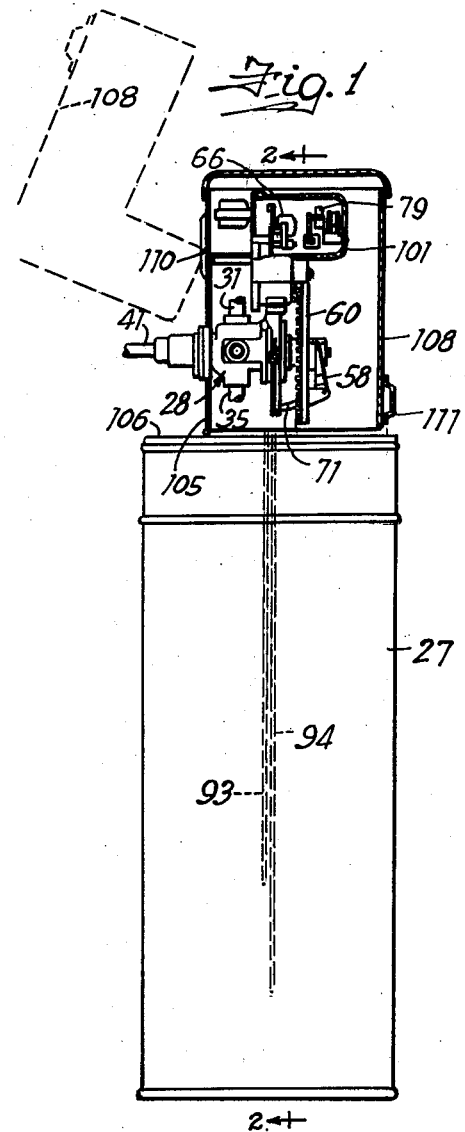
Fig. 1 is a side view of a brine tank and an automatic control mechanism including the multiple valve of my invention above it, showing the cover in section and indicating in dotted lines the open position of the cover.
Figure 2:
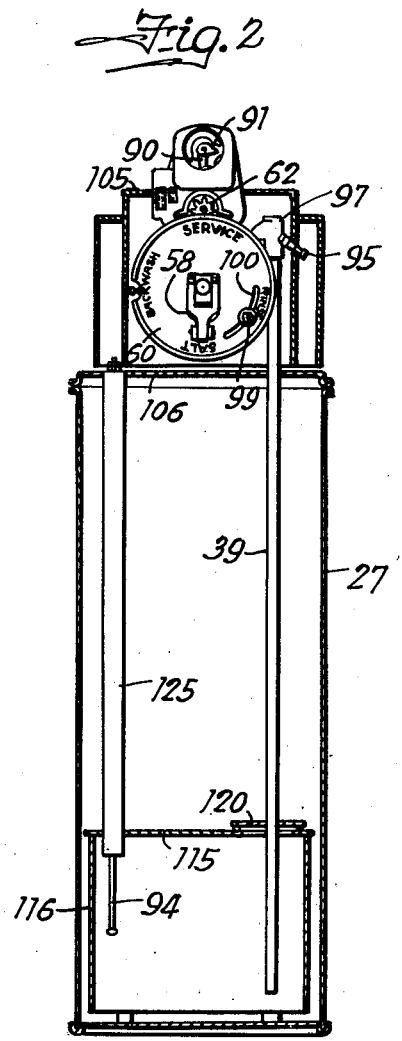
Fig. 2 is a vertical section on the line 2—2 of Fig. 1, with the cover opened and showing the automatic control mechanism in front elevation.
Figure 10:
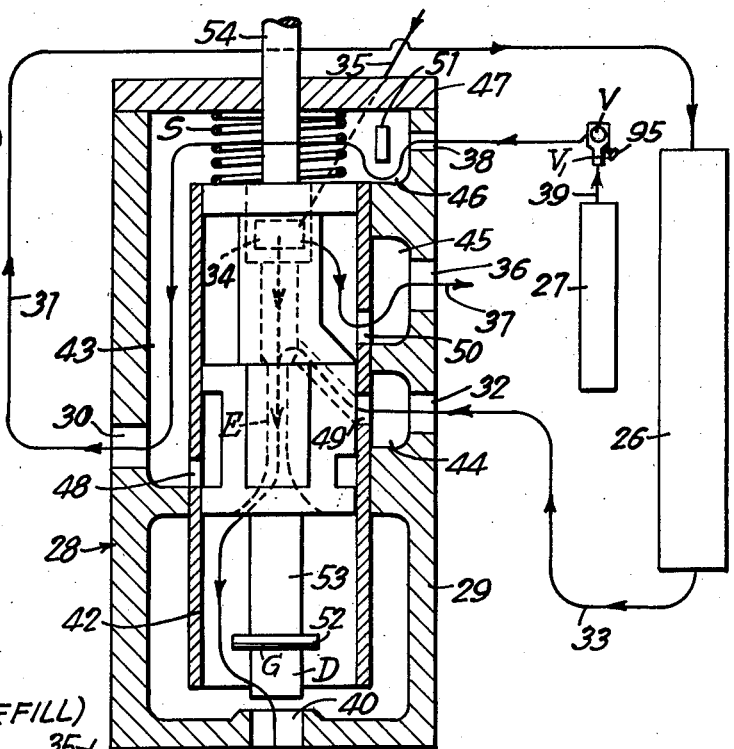
Figure 11:
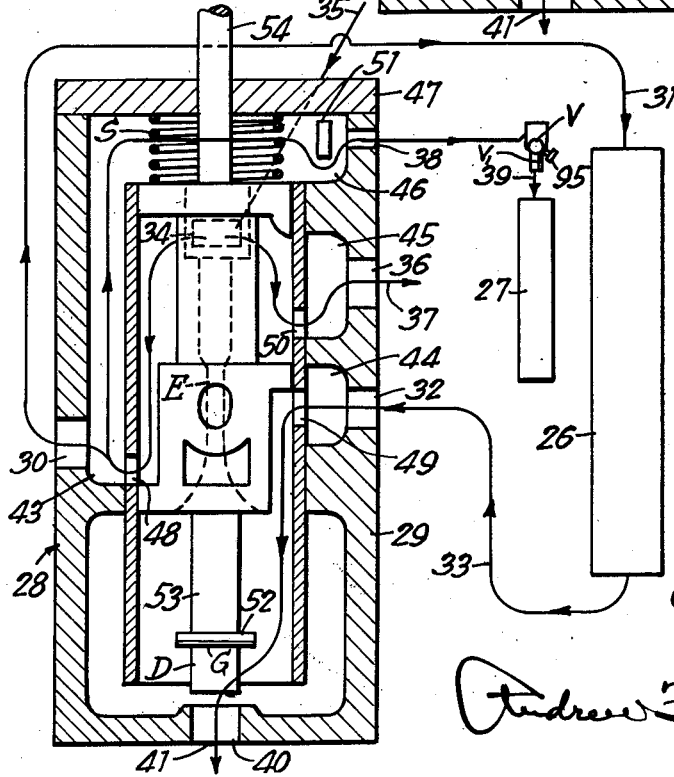

Referring to the drawings, the reference numeral 26 designates a water softener tank which contains a bed of zeolite or other base exchange water softening material, and 27 is a brine tank or saturator of improved design, the construction of which forms the subject matter of my copending application, Serial Number 248,210, filed September 25, 1951. The multiple valve 28 of my invention is along the lines of that disclosed in the copending applications of Charles E. Russell and myself, Serial Numbers 35,404 and 181,822, filed June 26, 1948, and August 28, 1850, respectively, which resulted in Patents No. 2,704,554 and No. 2,699,207, respectively, and establishes different systems of fluid communication between the softener 26, brine tank 27, a source of raw water supply, a service system, and a drain in the softening operation and the several steps of regeneration, namely, backwash, brining, and rinsing.

The valve 28 comprises a body element 29 provided with a plurality of holes adapted to be threaded for pipe connections, one of these holes 30 being connected, as indicated in Fig. 8, through a pipe 31 with the top of the softener tank 26 while another hole 32 in the same plane with hole 30 communicates with the bottom of the softener tank through a pipe 33. A third hole midway between the holes 30 and 32 and communicating with the port 34 has a pipe 35 connected thereto and extending from a source of raw water supply, as indicated in Fig. 8, and a fourth hole 36 communicates with the service system through a pipe 37. A hole 38 has a pipe 39 leading therefrom to the brine tank 27. Another hole 40 at the opposite end of the body 29 has a pipe 41 extending therefrom to the drain. A smooth cylindrical bore 42 in provided in the body centrally thereof and there are chambers 43, 44, and 45 provided in the body annularly of the bore and communicating with certain of the holes previously mentioned. Chamber 43 opens into a chamber 46 in the end of the body inside the cap 47. A port 48 establishes communication for chamber 43 with the bore 42. Another port 49 connects the bore 42 with chamber 44, and still another port 50 connects bore 42 with chamber 45. The hole 38 connected with the brine pipe 39 has a valve 51 for closing the same, and the hole 40 is arranged to be closed by a valve 52. Valve 51, as described in the copending application, Serial No. 35,404, is opened and closed automatically by the plunger 53 in different positions of rotation thereof. The plunger is indicated generally by the numeral 53 and is slidable and rotatable with a close working fit in the bore 42 relative to the various ports 34, 48, 49 and 50 to establish different flow circuits through the valve in the four different positions of the plunger 53 illustrated in Figs. 8 to 11. This plunger 53 carries the valve 52 on its one end, the valve 52 having in actual practice a lost-motion connection with the plunger and being spring-pressed in an outward direction relative to the plunger so that it will remain seated for a short time after some initial retracting movement of the plunger, as fully described in the copending application, Serial No. 35,404. A fairly heavy coiled compression spring S is provided between the body and plunger at the opposite end of the plunger from the valve 52 tending normally to urge the plunger inwardly toward the service position shown in Fig. 22. So much for the general details of the valve 28 itself.

The operation of the valve will be outlined briefly after I have described the means employed, in accordance with the present invention, for transmitting endwise and rotary movement to the plunger 53. Referring to Fig. 3, the plunger 53 terminates in a stem 54 that projects from the cap end 47 of the body through a bearing 55 provided on the cap 47. A block 56 is keyed to the outer end of the stem 54, as shown at 57, and is arranged to have rotary and endwise movement communicated thereto by means of a yoke or bell-crank lever 58 that is oscillatably mounted, as indicated at 59, on the operating wheel 60. The wheel 60 is supported for rotation on bearing 55 and is in the form of a gear, but in place of ordinary gear teeth, has pegs or pins 61 projecting rearwardly therefrom in uniformly circumferentially spaced relation, between which the teeth of a pinion 62 are arranged to mesh to transmit drive to the wheel 60. The pinion 62 has a hub 63 arranged to be frictionally secured to the reduced threaded end of a shaft 64 by means of a nut 65. A drive motor 66 transmits drive through a system of reduction gears to a pinion 67 and this pinion meshes with a gear 68 fixed on the end of shaft 64 opposite the pinion 62. When the motor runs, the wheel 60 will be turned, but quite slowly, preferably so that it takes, say, about six minutes, for example, to make one complete revolution. The purpose and advantage of such slow turning of the wheel 60 will be mentioned later. By merely loosening the nut 65, the wheel 60 is freed and one may turn the wheel by hand if it is desired to check the operation of the softener, as for example, at the time of installation. The bell-crank lever 58 has a forked end 69, the fingers of which are engaged between the projecting ends of two cross-pins 70 that extend through holes in the block 56, whereby to provide a pivotal driving connection between the bell-crank 58 and the stem 54. The other end 71 of the bell-crank 58 serves as a cam follower and slides in an annular cam track 72 provided in a ring 73 that is secured by means of screws 74 to the body 29 of the valve 28. In the rotation of the wheel 60, therefore, the bell-crank 58 is moved relative to the cam track 72 and is oscillated accordingly as the end 71 is moved radially with respect to the wheel 60 as it slides in the cam track 72. An arcuate cam 75 forms a part of the cam track 72 and is pivoted at one end, as at 76, on ring 73 while a screw 77 carried on a lug projecting from the ring behind the other end of the cam forms an adjustable support for that end, whereby to permit varying the backwash flow by merely adjusting the screw 77, the cam 75 being the portion of the cam track engaged by the end 71 of the bell-crank 58 in the backwash position of the wheel 60, and the multiple valve 28 having the cylindrical plug end D of its plunger 53 of such length and diameter and so arranged relative to drain port 40 that the rate of flow of water through the valve is dependent upon the endwise adjustment of the plunger 53 relative to the bore 42. In other words, the plunger 53 in the backwash position is shifted approximately 90° from service position and also shifted endwise to the extent determined by the adjustment of the cam 75, the compound movement being obtained by 90° rotation of wheel 60, during which the bell-crank 58 not only turns the plunger 53 by means of its stem end 54 through the same angle but shifts the plunger endwise as a result of the oscillation of the bell-crank by slidable engagement of its end 71 on cam 75. The plunger 53, as stated before, is spring-pressed inwardly relative to body 29 and is movable outwardly by means of the bell-crank 58. Hence, the end 71 of the bell-crank 58 engages cam 75 under this same spring pressure. It should be clear from inspection of Figs. 8 to 11 and from a study of the cam track 72 in Fig. 4 that the bell-crank 58 continues to hold the plunger 53 pulled out in the brining and rinsing positions and that it turns the plunger through an additional 90° in shifting from the backwash to the brining position, and then through an additional 45° or thereabouts in shifting from the brining to the rinsing position. As will soon appear there is a slow rinse during which the brine tank is refilled, the slow rinse being in fact timed by correlating it with the refilling of the brine tank at a slow enough rate to provide adequate rinsing. Then, when the brine tank is refilled, the wheel 60 turns through another 135°, or thereabouts, back to the service position, and during the first portion of that final movement, through approximately 45° turning of the plunger 53, the ports in the plug and body, which during the slow rinse were only in restricted communication are opened gradually into unrestricted communication for about a half minute for a fast rinse before the rinse flow is shut off by the further turning of the plunger 53. The fast rinse, which is faster than any normal service flow rate, is considered highly beneficial because it affords a good opportunity to clear out any traces of salt and released calcium which the slow rinse flow was incapable of removing, thereby putting the zeolite bed in the best possible condition for the resumption of softening. Analogous to the adjustment provided at 77 is another adjustment afforded by a rotatably adjustable cam C which provides a variable "rise" at the end of the cam track 72 for cooperation with the end 71 of the bell-crank 58 to insure tight seating of the drain valve 52 when the valve 28 reaches the service position. This cam is in the form of an eccentric adapted to be fastened in adjusted position by tightening the bolt $C_1$ that extends through an eccentric hole in the cam and threads in a boss on the ring 73, as clearly shown in Fig. 3. By this adjustment there is avoided the necessity for too close tolerances in the manufacture of this equipment, because the throw of the cam C is more than enough to make up for such minor irregularities as are not to occur in the quantity production of the valves 28 and the other parts of the assembly, and the annoyance of even a slight leakage from the drain can be easily avoided by increasing the rise of the cam C relative to the end of track 72 enough to make the drain valve 52 seat a bit tighter. The rubber gasket G on the face of valve 52 compresses to allow the further movement needed for a tighter seal.

The operation of the valve 28 can now be described by referring to Figs. 8 to 11. Legends "Service," "Backwash," "Salt," and "Rinse" are provided on the front face of the operating wheel 60, as shown in Figs. 3a and 4, indicating the four operating positions of the valve 28. In the Service position, illustrated in Fig. 8, the incoming raw water from the pipe 35 is conducted through port 34 in the body 29 and through passage 43 to pipe 31 leading to the top of the softener 26. The raw water passing through the bed of zeolite in the softener is softened and soft water leaving the bottom of the tank through pipe 33 is conducted back to the valve, and thence to the service system through pipe 37. At the end of the "service" run the plunger 53 in the valve 28 is shifted to the Backwash position shown in Fig. 9 by endwise movement and simultaneous rotation through 90°, the bell-crank 58 giving this compound movement to the plunger in the turning of the wheel 60, as previously described. In the "backwash" position, the incoming raw water from pipe 35 is conducted to the bottom of the softener tank 26 through pipe 33 and flows upwardly through the bed of zeolite to break up the bed and wash out the sediment that accumulated on top of it, in order to prepare the bed for the salt draw. The waste water containing the sediment is conducted through pipe 31 from the top of the softener tank back to the valve, and thence to the drain through pipe 41. The regulation of backwash flow by adjustment of screw 77 determines the size of opening at the drain port 40 by determining how far the end D of plunger 53 is withdrawn. The backwash flow is accurately timed, as will soon appear, and at the end of the backwash the plunger 53 is turned another 90° to the Salt or Brining position illustrated in Fig. 10. In this position of the valve, the incoming raw water from pipe 35 is conducted through the plunger 53 directly to the drain 41, as indicated. The ejector E forms part of the plunger and is accordingly set into operation when the raw water is passed through the plunger to the drain. Consequently, there is entrained in the ejector E with this water going to the drain, water from the bottom of the softener tank 26 through pipe 33, and, inasmuch as the pipe 39 extending into the brine tank 27 is connected through the valve and pipe 31 with the top of the softener tank 26, brine is drawn from the brine tank into the top of the softener tank in an amount equivalent to the amount of water withdrawn from the bottom of the softener tank. In that way 100% saturated brine is supplied for most efficient regeneration of the zeolite bed. When a predetermined amount of brine has been withdrawn from the brine tank 27, the wheel 60 is turned through about 45° to the Rinse position shown in Fig. 11. In the "rinse" position, the incoming raw water from pipe 35 is conducted through pipe 31 to the top of the softener tank for passage downwardly therethrough to carry the brine through the bed and rinse out released calcium from the bed, the spent brine and waste water leaving the bottom of the softener tank being conducted through pipe 33 back to the valve and thence to the drain 41. At the same time, a much smaller amount of water is bypassed through the valve 51 through pipe 39 to the brine tank to refill it, the purpose in the restricted flow for refilling being to enable timing the rinse by the length of time it takes to refill the brine tank. During each of the steps of backwash, brining and rinsing, it will be observed that raw water is bypassed to the service system 37, so that the system is not completely shut off during regeneration.

Referring now to Fig. 7 for a general understanding of the operation, in so far as the electrical circuits are concerned, the motor 66 is arranged to be started by the operator pressing a push button 78 when the softener requires regeneration. The source of power is 110 volt, 60 cycle, alternating current, reduced to 24 volt current through the transformer T. The power units are the drive motor 66 mentioned before and the timer motor 79. The controls are the push button 78 mentioned before and limit switches 80, 81 and 82 operated by the wheel 60, limit switches 83 and 84 operated by the timer motor 79, and relay 85 controlling switches 86, 87 and 88. When the push button 78 is pressed it causes the motor 66 to run so as to turn the wheel 60 from the "service" position in a clockwise direction. The wheel starts, stops when it has turned through 90° to the "backwash" position, and remains in that position for the duration of the backwash. The switches 80—82 are spaced radially with respect to the wheel 60, as most clearly appears in Figs. 3 and 5 and there are lugs on the wheel 60 in circumferentially spaced relation and at different radii arranged to operate the three switches, one of these lugs being indicated at 89 in Fig. 3 operating the switch 80, as at the commencement of a regeneration. The operator keeps the push button 78 depressed long enough for lug 89 to close switch 80, whereupon the push button has served its purpose and may be released, the motor 66 continuing to operate until the next lug on the wheel 60, 90° removed from lug 89, operates switch 81. Operation of switch 81 serves two functions: It opens the circuit for motor 66, causing it to stop with the wheel 60 in the "backwash" position, and it simultaneously closes the circuit for timer motor 79, causing it to run. Now, the timer motor 79 operates two cams 90 and 91 which are adjustably fixed on the shaft 92 at any selected angularity with respect to one another. The motor operates this shaft through reduction gearing so that it takes 30 minutes for the shaft to make a complete revolution. Consequently, the length of the backwash may be anything up to 30 minutes, depending upon the angular adjustment of the cams 90 and 91 relative to one another. Cam 90, which operated switch 84 to an open position at the end of the previous run to stop motor 79, closes that switch when the switch 81 starts the motor 79 running, and the motor 79 then continues to run (namely, for 30 minutes) until the cam 90 again operates switch 84 to the open position. According to the size of the included angle for which cam 91 is adjusted relative to cam 90 the backwash time is determined, because, when cam 91 closes switch 83, the circuit for the power motor 66 is closed and the wheel 60 is turned from the "backwash" position to the "salt" or "brining" position, where it stops by reason of a third lug 89' on wheel 60, 180° removed from lug 89, engaging switch 80 to stop the motor 66. In other words, switch 80 is arranged to be operated by either one of the two lugs 89 or 89', disposed 180° apart and at the same radius with respect to wheel 60. The lugs for operating switches 81 and 82 are on other radii corresponding to the radii of those switches relative to wheel 60, one of these two lugs being a lug 99 mounted for adjustment in an arc relative to wheel 60 in the arcuate slot 100 provided in the wheel, the adjustment of this lug in a clockwise direction, as viewed in Fig. 4, causing the stoppage of the wheel 60 sooner and accordingly reducing the rinse flow rate because of the fact that the ports in the plunger 53 are only in restricted communication with the ports in the body 29. If the lug 99 is adjusted in a counterclockwise direction, as viewed in Fig. 4, the wheel 60 will be stopped later and in a position in which the ports in the plunger 53 are more nearly in full register with the body ports allowing more water to flow through the softener. In either event, the flow through the valve 28 for rinse purposes is much greater than that used for refilling the brine tank, because the flow for refill purposes must, as will soon appear, be restricted almost to a trickle in relation to the rinse flow in order to prolong the rinse to the extent required for good and adequate rinsing of the bed, and such fine regulation of flow is made possible by the bleeder valve 97 adjustable by screw 95.

Continuing with Fig. 7, in the "salt" or "brining" position of the valve 28, brine is drawn from the tank 27 until the brine level drops from the electrode 93 to below the level of electrode 94. In other words, the brine maintains a circuit through relay 85 throughout the "service" operation and up to and including the "salt" or "brining" phase of regeneration. This is advantageous from the standpoint that it means such a small expense in current consumed for the sizeable advantage gained, there being enough heat generated by this small current flow to insure the relay and its switches remaining dry and free of rust and hence more certain of functioning properly. So long as the relay 85 remains energized, the valve remains in the "salt" position, but, as soon as the brine level drops below electrode 94, relay 85 is de-energized and switch 87 is closed to start the power motor 66, so that wheel 60 will be turned from the "salt" position to the "rinse" position. The lug 99 on the wheel 60 opens switch 82 to stop the motor with the wheel 60 in the "rinse" position. The restricted communication between the ports in the plunger 53 and body 29 afforded in that particular position of rotation of the plunger determines the rinse flow rate, as stated before, and to decrease the flow rate one adjusts lug 99 one way, whereas increase in the flow rate is obtained by adjusting the lug 99 in the opposite direction. The rinse period is timed, as previously described, by timing the refilling of the brine tank 27. This timing involves the adjustment of a screw 95 to restrict flow through a bleeder groove $V_1$ on one side of a seat 96 provided in an elbow fitting 97 for a ball check valve V. This fitting 97 is provided on the upper end of the brine pipe 39 and connects it with the valve 28 by means of a pipe 98. The ball check valve V unseats to allow unrestricted out-flow of brine from the tank 27 through pipe 39 during the brine draw, but, when the valve 28 is in the "rinse" position, the ball check valve V tends to close under pressure of raw water flowing in the opposite direction through pipe 39 into the brine tank, the refill flow rate being determined by the close adjustment of screw 95 relative to groove $V_1$ so that it will take long enough to refill the brine tank to insure a good and adequate rinsing of the bed in the softener tank 26. Usually, the screw 95 is used only to restrict flow through groove $V_1$. However, it can be used also to unseat the ball V more or less, but that would, of course, permit more flow than is permitted through the groove $V_1$ when the screw is backed up all the way. There is no danger of the ball check valve V reaching any position during the brine draw where it would constitute an obstruction to brine flow, because there are lugs 96' projecting from opposite sides of the bore in the outlet leg of the fitting 97 which keep the ball check valve V caged in the fitting in spaced relation to the end of the pipe 98. It is important to note that with this arrangement, changes in water pressure will not affect the rinsing operation appreciably because if the water pressure drops from, say, 50 pounds to say 25 pounds, so that there is half as much water flowing through the bed, that same pressure drop results in proportionately reducing the amount of water going into the brine tank 27 to refill it. Consequently, the softener is assured of a proper rinsing under all conditions. The advantage of the ball check valve V and screw for adjusting the flow through the bleeder groove $V_1$, as compared with having, let us say, a restricted bypass port regulated by a needle valve, is that I obtain the desired fine restriction without involving the danger of the restriction being clogged by dirt and sediment, because the ball check valve V closes one side of the groove $V_1$, to define the restricted bleeder port, and this valve V is unseated every time the valve 28 is moved to the "salt" or "brining" position, and hence any foreign matter that might have collected between the ball check valve V and the groove $V_1$ will be cleared out by the flow of the brine. When the water level in the brine tank 27 rises to the point where it contacts electrode 93, the circuit through relay 85 is closed again, opening switch 87 and closing switches 86 and 88 so as to start the power motor 66 and turn the wheel 60 from the "rinse" position back to the "service" position where lug 89 opens switch 80 and stops the motor 66, the wheel 60 and valve 28 connected therewith then remaining in the "service" position until the next regeneration of the softener is commenced by the operator pressing the button 78 again.

It is important to note that the operations of "backwash," "salting" and "rinsing" are independent of one another and merely follow one another. Consequently, any adjustment of or any abnormality in any one of these operations has no effect on the succeeding operation. Thus, the softener stays in the "service" position until the circuit is closed by the push button 78, whereupon the valve is shifted to the "backwash" position; then it stays in the "backwash" position until the timer motor 79 closes the circuit for the motor 66 to shift the valve to the "salt" position; it stays in the "salt" position until a predetermined amount of brine has been drawn, whereupon the valve is shifted to the "rinse" position, where it stays until the brine that has been drawn from the brine tank is replaced by raw water, after which the valve shifts back to "service" position. In contrast to this, other automatic softeners have a backwash, followed by a rinse, which is controlled by a time clock that predetermines having the complete cycle occur in a given length of time. Hence, if drawing the salt requires more time than the designer originally figured it would, due to the water pressure available, the extra time required for the long salt draw would necessitate subtracting from the rinse time remaining and allowable in the overall time program. In other words, in these other automatic softeners any abnormal condition in one step of the regeneration makes necessary some sort of a compromise in a preceding or a following step. With the present invention, there are no such difficulties because only the backwash time is measured by the timing motor 79 and sufficient leeway can be allowed to insure an adequate length of backwash, regardless of anticipated changes in water pressure. In any installation there must, of course, be sufficient water pressure available to cause the ejector E (Fig. 10) to operate even at the lowest pressure, where the operation would be slower, but even under such adverse conditions the valve will remain in the salt or brining position until a predetermined amount of brine has been transferred to the softener. In the rinse operation, assuming there has been proper adjustment of the screw 95 for the brine tank refilling rate and proper adjustment of the lug 99 for the rinse flow rate, it follows that any anticipated fluctuation will affect these two operations alike, and, if the pressure drops, the rinse rate drops proportionately but the refill rate also drops proportionately, so that the time required for the two operations to be completed is proportionately extended, thereby insuring that the total amount of water passed through the softener in the rinse operation is about the same in each regeneration regardless of pressure fluctuation.

While I have described a softener in which regeneration is started by pressing a push button 78 it should be understood that this same function can be performed by a meter closing the electrical circuit when a predetermined gallonage of water has passed through the softener, or the circuit can be closed by a time clock mechanism at the end of a selected time interval, or the circuit can be closed by any hardness testing device when the water going to the service system falls below a predetermined standard as to hardness. In the foregoing description I also described the backwash as timed by the motor 79 according to the setting of the dogs 90 and 91, but it should be understood that the backwash flow could be controlled as to time by a turbidity or color detector in the form of a photoelectric cell which would maintain the valve in the backwash position until the water going to the drain became clear.

The housing 101, in which the power motor 66 and timer motor 79 are mounted and in which the drive gear train connected with the motor 66 is also housed, and also the switches 80, 81 and 82, is, as shown in Fig. 4, removable from the rest of the assembly, it being secured to the ring 73 by means of bolts 102 for support with the pinion 62 meshing in the pin gear 61 provided on the back of the wheel 60. This simplifies the problems of servicing the softener, because, in the event of any electrical trouble, the service man merely removes the housing 101 and replaces it with another sealed unit and sends or takes the removed unit back to the factory without having tampered with any of the mechanism therein, and then it can be repaired by those at the factory especially qualified to do such work. If the service man did not happen to have a replacement unit ready to install, the softener could be regenerated by hand operation of valve 28 by turning the wheel 60 from "service" to "backwash" and from "backwash" to "salt" and from "salt" to "rinse" and finally from "rinse" back to "service." In like manner, the valve 28 may be operated manually while the power unit is still in place, by merely loosening the nut 65 to permit the pinion 62 to turn freely relative to shaft 64, thereby leaving the wheel 60 free to be turned manually.

A U-shaped sheet metal housing 105 is secured to the top of the fixed rear section 106 of the cover of the brine tank 27, as shown at 107, and has a generally U-shaped lid or cover 108 closing the open front thereof, the top 109 of which is of generally cylindrical form and overlies the top of the housing 105 and is hinged thereto at the rear, as indicated at 110, so as to permit swinging the cover upwardly and rearwardly to an out-of-the-way position, as indicated in dotted lines in Fig. 1, a handle or knob 111 being provided on the front lower portion of the cover 108 to facilitate the opening and closing. Pipes 33 and 37 extending horizontally from opposite sides of the body of the valve 28 extend through holes in the side walls of the housing 105 and serve to support the valve on the housing, the rear portion of the valve extending through a hole in the rear wall of the housing 105, as shown in Fig. 1, to further support the valve on the housing and prevent turning thereof about the pipes 33 and 37 as an axis. The brine pipe 39, which extends downwardly from the valve through an opening in the cover 106, as shown in Fig. 3, is also an important factor in holding the valve steady. Of course, as soon as the various pipes extending from the valve are connected up with the raw water pipe, service pipe and drain pipe in an installation, such connections serve to make the valve that much more rigid.

The brine tank 27, while capable of being used in connection with a hand operated softener, is most advantageous when used in combination with the present automatic softener, because it is designed to permit adding salt in whatever amount may be needed and whenever the operator, upon removing the removable front cover section 112, sees that the salt level is not near enough to the top of the tank 27.

It is believed the foregoing description conveys a good understanding of the objects and advantages of my invention. The appended claims have been drawn to cover all legitimate modifications and adaptations.

I claim:

1. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger fitting closely but slidably and rotatably in said bore, spring means normally urging said plunger toward the ported end of said bore, an operating wheel rotatably mounted relative to said body, a bell crank lever pivotally mounted intermediate its ends on and turning with the wheel and operatively connected at one end with said plunger for transmitting simultaneous rotation as well as endwise movement to said plunger toward the other end of said bore against the action of said spring means in the rotation of said wheel and simultaneous oscillation of said bell-crank lever, a poppet type shut-off valve for closing said end port carried on the adjoining end of said plunger, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, and said shut-off valve having a cylindrical extension fitting closely in the end port and arranged to be withdrawn therefrom to a variable extent by varying the endwise movement of the plunger, and a cam on said body slidably engaging the other end of said bell-crank lever to cause oscillation thereof in the rotation of the wheel, said cam including a manually adjustable portion whereby the endwise movement of said plunger may be varied.

2. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger fitting closely but slidably and rotatably in said bore, spring means normally urging said plunger toward the ported end of said bore, cooperating cam and follower means on said body and plunger held engaged under the pressure of said spring means predetermining a single operative position of said plunger in respect to its endwise and rotary movement adjacent the end port to establish one system of communication for fluid flow between said radial ports and predetermining a raised position of said plunger in removed relation to said end port, wherein the plunger is adapted to be turned to any one of a plurality of operative positions, each establishing a different system of communication for fluid flow between said radial ports, each such system including said end port, means to transmit rotary movement to said plunger permitting endwise movement thereof, and a poppet type shut-off valve for closing said end port carried on the adjoining end of said plunger, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, and said shut-off valve having a cylindrical extension fitting closely in the end port and arranged to be withdrawn therefrom to a variable extent by varying the endwise movement of the plunger, said cooperating cam and follower means including a manually adjustable cam for varying the endwise movement of said plunger.

3. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger fitting closely but slidably and rotatably in said bore, spring means normally urging said plunger toward the ported end of said bore, a poppet type shut-off valve for closing said end port carried on the adjoining end of said plunger, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, said shut-off valve having a cylindrical extension fitting closely in the end port and arranged to be withdrawn therefrom to a variable extent by varying the endwise movement of the plunger, and means for transmitting rotation as well as endwise movement to said plunger including cooperating cam and follower means on said body and plunger held engaged under the pressure of said spring means predetermining a raised operative position of said plunger in removed relation to said end port, wherein the plunger is adapted to be turned to any one of a plurality of operative positions, each establishing a different system of communication for fluid flow between said radial ports, each such system including said end port, at least one of said operative positions having the cylindrical extension in closer proximity to said end port than another position.

4. A valve structure as set forth in claim 3, wherein the cooperating cam and follower means includes a manually adjustable cam, the adjustment of which correspondingly varies the spacing of the cylindrical extension relative to the end port.

5. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger fitting closely but slidably and rotatably in said bore, spring means normally urging said plunger toward the ported end of said bore, a poppet type shut-off valve for closing said end port carried on the adjoining end of said plunger, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, an operating wheel rotatable relative to said body, a bellcrank lever pivoted intermediate its end on said wheel for oscillation in a plane radially relative to the wheel, an annular cam fixed relative to said body slidably engaged by one end of said lever as a follower, and means operatively connecting the other end of said lever with said plunger to transmit rotation as well as endwise movement to said plunger toward the other end of said bore against the action of said spring means in the rotation of said wheel.

6. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger fitting closely but slidably and rotatably in said bore, a poppet type shut-off valve for closing said end port carried on the adjoining end of said plunger, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, an operating wheel rotatable relative to said body, a bellcrank lever pivoted intermediate its ends on said wheel for oscillation in a plane radially relative to the wheel, an annular cam fixed relative to said body slidably engaged by one end of said lever as a follower, and means operatively connecting the other end of said lever with said plunger to transmit rotation as well as endwise movement to said plunger in the rotation of said wheel.

7. A valve structure as set forth in claim 6, including as a part of the annular cam a section adjustable radially with respect to said wheel.

8. A valve as set forth in claim 6, including in conjunction with the annular cam a rotatably adjustable eccentric at one point of its circumference adapted to provide a variable high point engageable by the follower end of the bellcrank lever when the shut-off valve is disposed in its closed position whereby to permit closing said valve with varying degrees of tightness.

9. A valve as set forth in claim 6, including in conjunction with the annular cam a rotatably adjustable eccentric at one point of its circumference adapted to provide a variable high point engageable by the follower end of the bellcrank lever when the shut-off valve is disposed in its closed position whereby to permit closing said valve with varying degrees of tightness, the shut-off valve having a gasket on its seating face of compressible material allowing a certain range of adjustment of said eccentric by the variation in the degrees of compression of the gasket.

10. A valve structure as set forth in claim 6, including a stop member adjustable on the wheel circumferentially with respect thereto to predetermine the degree of port opening obtained in rotary adjustment of the plunger to a certain position established by said stop when it arrives at a terminal position relative to the valve body.

11. A valve structure, comprising a body having an elongated bore therein, and a plurality of substantially radial ports provided therein in endwise and circumferentially spaced relation relative to and communicating with the bore, an elongated valve plunger fitting closely but slidably and rotatably in said bore, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, an operating wheel rotatable relative to said body, a bellcrank lever pivoted intermediate its ends on said wheel for oscillation in a plane radially relative to the wheel, an annular cam fixed relative to said body slidably engaged by one end of said lever as a follower, and means operatively connecting the other end of said lever with said plunger to transmit rotation as well as endwise movement to said plunger in the rotation of said wheel.

12. A valve structure as set forth in claim 11, including as a part of the annular cam a section adjustable radially with respect to said wheel.

13. A valve structure, comprising a body having an elongated bore therein, and a plurality of substantially radial ports provided therein in endwise and circumferentially spaced relation relative to and communicating with the bore, an elongated valve plunger fitting closely but slidably and rotatably in said bore, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, an operating wheel rotatable relative to said body, a bellcrank lever pivoted intermediate its ends on said wheel for oscillation in a plane radially relative to the wheel, an annular cam fixed relative to said body slidably engaged by one end of said lever as a follower, means operatively connecting the other end of said lever with said plunger to transmit rotation as well as endwise movement to said plunger in the rotation of said wheel, and a stop member adjustable on the wheel circumferentially with respect thereto to predetermine the degree of port opening obtained in rotary adjustment of the plunger to a certain position established by said stop when it arrives at a terminal position relative to the valve body.

14. A valve as set forth in claim 11, including in conjunction with the annular cam a rotatably adjustable eccentric at one point of its circumference adapted to provide a variable high point engageable by the follower end of the bellcrank lever.

15. In combination, a multiple valve comprising a ported valve body and a plunger rotatable and reciprocable in said body, an operating wheel rotatably mounted relative to said body, a bell-crank lever pivotally mounted intermediate its ends on and turning with the wheel and operatively connected at one end with the plunger to transmit simultaneous rotary and reciprocatory movement to the plunger in the rotation of the wheel and simultaneous oscillation of the bell-crank lever, a cam slidably engaging the other end of said bell-crank lever to cause oscillation thereof in the rotation of the wheel, and power operated means operatively connected with said wheel to turn it.

16. In combination, a multiple valve comprising a ported valve body and a ported rotor rotatable in a bore provided in said body, an operating hand wheel connected with said rotor to transmit rotary movement thereto, a bell-crank lever pivotally mounted intermediate its ends on and turning with said wheel and operatively connected at one end with the rotor to transmit simultaneous rotary and reciprocatory movement to said rotor in the turning of said wheel and simultaneous oscillation of the bell-crank lever, and a cam slidably engaging the other end of said bell-crank lever to cause oscillation thereof in the rotation of the wheel.

17. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger fitting closely but slidably and rotatably in said bore, spring means normally urging said plunger toward the ported end of said bore, a poppet type shut-off valve for closing said end port carried on the adjoining end of said plunger, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, an operating hand wheel rotatable relative to said body, a bellcrank lever pivoted intermediate its ends on said wheel for oscillation in a plane radially relative to the wheel, an annular cam fixed relative to said body slidably engaged by one end of said lever as a follower, means operatively connecting the other end of said lever with said plunger to transmit rotation as well as endwise movement to said plunger toward the other end of said bore against the action of said spring means in the rotation of said wheel, a motor for driving said wheel, a countershaft driven by said motor at reduced speed and carrying a pinion meshing with a gear fixed to the wheel, said pinion having a hub rotatable on the shaft, and a nut threaded on said shaft and tightenable against the hub of said pinion to frictionally drive the same, whereby when the nut is loosened the wheel may be turned by hand to operate the valve independently of the motor.

18. A valve structure, comprising a body having an elongated bore therein and having a port provided therein at one end of the bore, and a plurality of substantially radial ports provided therein in endwise and circumferentially spaced relation relative to and communicating with the bore, an elongated valve plunger fitting closely but slidably and rotatably in said bore, a poppet type shut-off valve for closing said end port carried on the adjoining end of said plunger, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, an operating hand wheel rotatable relative to said body, a bellcrank lever pivoted intermediate its ends on said wheel for oscillation in a plane radially relative to the wheel, an annular cam fixed relative to said body slidably engaged by one end of said lever as a follower, means operatively connecting the other end of said lever with said plunger to transmit rotation as well as endwise movement to said plunger in the rotation of said wheel, a motor for driving said wheel, a countershaft driven by said motor at reduced speed and carrying a pinion meshing with a gear fixed to the wheel, said pinion having a hub rotatable on the shaft, and a nut threaded on said shaft and tightenable against the hub of said pinion to frictionally drive the same, whereby when the nut is loosened the wheel may be turned by hand to operate the valve independently of the motor.

19. A valve structure as set forth in claim 18, including as a part of the annular cam a section adjustable radially with respect to said wheel.

20. A valve as set forth in claim 18, including in conjunction with the annular cam a rotatably adjustable eccentric at one point of its circumference adapted to provide a variable high point engageable by the follower end of the bellcrank lever when the shut-off valve is disposed in its closed position whereby to permit closing said valve with varying degrees of tightness.

21. A valve as set forth in claim 18, including in conjunction with the annular cam a rotatably adjustable eccentric at one point of its circumference adapted to provide a variable high point engageable by the follower end of the bellcrank lever when the shut-off valve is disposed in its closed position whereby to permit closing said valve with varying degrees of tightness, the shut-off valve having a gasket on its seating face of compressible material allowing a certain range of adjustment of said eccentric by the variation in the degrees of compression of the gasket.

22. A valve structure as set forth in claim 18, including a stop member adjustable on the wheel circumferentially with respect thereto to predetermine the degree of port opening obtained in rotary adjustment of the plunger to a certain position established by said stop when it arrives at a terminal position relative to the valve body.

23. A valve structure, comprising a body having an elongated bore therein, and a plurality of substantially radial ports provided therein in endwise and circumferentially spaced relation relative to and communicating with the bore, an elongated valve plunger fitting closely but slidably and rotatably in said bore, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, an operating hand wheel rotatable relative to said body, a bellcrank lever pivoted intermediate its ends on said wheel for oscillation in a plane radially relative to the wheel, an annular cam fixed relative to said body slidably engaged by one end of said lever as a follower, means operatively connecting the other end of said lever with said plunger to transmit rotation as well as endwise movement to said plunger in the rotation of said wheel, a motor for driving said wheel, a countershaft driven by said motor at reduced speed and carrying a pinion meshing with a gear fixed to the wheel, said pinion having a hub rotatable on the shaft, and a nut threaded on said shaft and tightenable against the hub of said pinion to frictionally drive the same, whereby when the nut is loosened the wheel may be turned by hand to operate the valve independently of the motor.

24. A valve structure as set forth in claim 23, including as a part of the annular cam a section adjustable radially with respect to said wheel.

25. A valve as set forth in claim 23, including in conjunction with the annular cam a rotatably adjustable eccentric at one point of its circumference adapted to provide a variable high point engageable by the follower end of the bellcrank lever.

26. A valve structure, comprising a body having an elongated bore therein, and a plurality of substantially radial ports provided therein in endwise and circumferentially spaced relation relative to and communicating with the bore, an elongated valve plunger fitting closely but slidably and rotatably in said bore, said plunger functioning as a plunger type valve with respect to the radial ports in a plurality of different positions of endwise and rotary movement and having for that purpose projecting from its periphery a plurality of circumferentially extending bearing portions in coaxially spaced relation and also longitudinally extending bearing portions fitting closely but slidably in said bore, an operating hand wheel rotatable relative to said body, a bellcrank lever pivoted intermediate its ends on said wheel for oscillation in a plane radially relative to the wheel, an annular cam fixed relative to said body slidably engaged by one end of said lever as a follower, means operatively connecting the other end of said lever with said plunger to transmit rotation as well as endwise movement to said plunger in the rotation of said wheel, a stop member adjustable on the wheel circumferentially with respect thereto to predetermine the degree of port opening obtained in rotary adjustment of the plunger to a certain position established by said stop when it arrives at a terminal position relative to the valve body, a motor for driving said wheel, a countershaft driven by said motor at reduced speed and carrying a pinion meshing with a gear fixed to the wheel, said pinion having a hub rotatable on the shaft, and a nut threaded on said shaft and tightenable against the hub of said pinion to frictionally drive the same, whereby when the nut is loosened the wheel may be turned by hand to operate the valve independently of the motor.

References Cited in the file of this patent

UNITED STATES PATENTS

| | | |
|---|---|---|
| 573,342 | Miller | Dec. 15, 1896 |
| 777,374 | Howard | Dec. 13, 1904 |
| 1,510,469 | Duggan | Oct. 7, 1924 |
| 1,788,358 | Goerg | Jan. 6, 1931 |
| 1,910,004 | DeVille | May 23, 1933 |
| 1,947,248 | Burks | Feb. 13, 1934 |
| 1,954,406 | Dotterweich | Apr. 10, 1934 |
| 1,957,044 | Johansson | May 1, 1934 |
| 1,967,851 | Wilson | July 24, 1934 |
| 2,052,827 | Hexamer et al. | Sept. 1, 1936 |
| 2,093,692 | Daniels | Sept. 21, 1937 |
| 2,217,692 | McGill | Oct. 15, 1940 |
| 2,254,795 | Daniels | Sept. 2, 1941 |
| 2,435,366 | Riche | Feb. 3, 1948 |
| 2,450,481 | May | Oct. 5, 1948 |
| 2,471,289 | Sedgwick | May 24, 1949 |
| 2,507,343 | Lindsay et al. | May 9, 1950 |
| 2,516,388 | Humphreys | July 25, 1950 |
| 2,547,254 | Braithwaite | Apr. 3, 1951 |
| 2,556,780 | Shryock | June 12, 1951 |